United States Patent Office 3,835,011
Patented Sept. 10, 1974

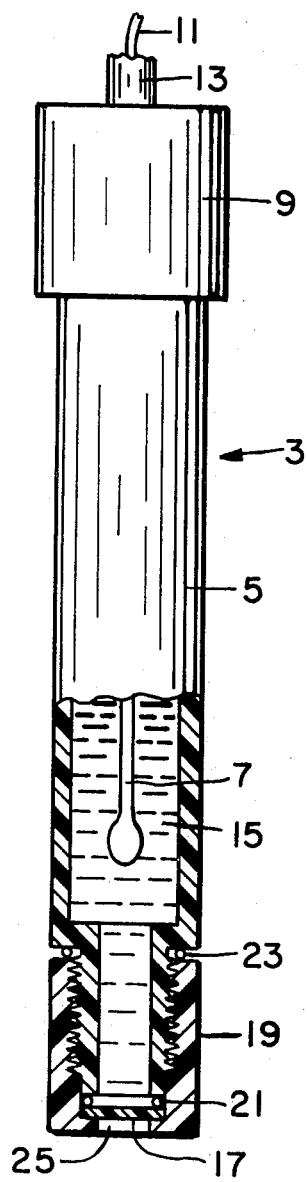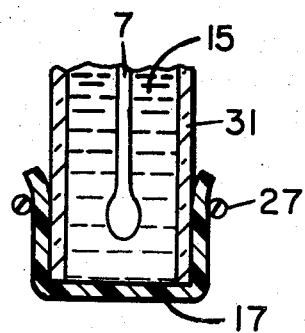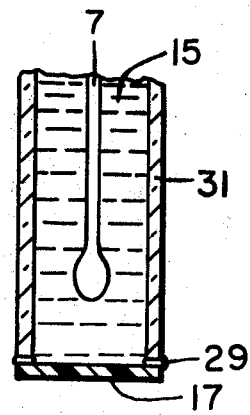
Fig. 1
Fig. 2
Fig. 3

3,835,011
POTASSIUM ION SENSITIVE ELECTRODE
George Baum, Corning, and Merill Lynn, Big Flats, N.Y., assignors to Corning Glass Works, Corning, N.Y.
Filed June 23, 1972, Ser. No. 265,771
Int. Cl. G01n 27/30, 27/46
U.S. Cl. 204—195 M                     10 Claims

ABSTRACT OF THE DISCLOSURE

Electrode for measuring the concentration of potassium ions in aqueous solution wherein the sensing portion is a polyvinyl chloride membrane containing a potassium tetraphenylborate dissolved in an organic solvent which also plasticizes the PVC. A preferred electrode measures the concentration of potassium ions in the presence of varying amounts of sodium ions. Methods of preparing and using the electrodes are disclosed.

BACKGROUND OF THE INVENTION

Electrodes for determining ion concentrations in aqueous solutions are well known. Electrodes have been designed to measure both cationic and anionic concentrations. To measure such concentrations, two electrodes are commonly used; a sensor electrode and a reference electrode. In use, the two electrodes are connected to an electrometer and then immersed in an aqueous test solution. Depending on the construction of the sensor electrode and the extent of ionic activity in the test solution, an electrochemical potential is developed. This results in a potential reading on the electrometer. Since ionic activity is a measure of ionic concentration, the potential reading on the electrometer can be translated into a measure of ionic concentration in a given test solution.

The choice of sensor electrode depends on the type of ion concentration to be measured. For cationic concentration measurements, the sensor electrode must be sensitive to cationic activity; contrariwise where anionic concentrations are to be determined. For a sensor electrode to be usefully sensitive to the activity of a particular ion, the electrode must be of such a nature that it senses the activity of that particular ion in preference to the activities of other ions which may be present in a test solution.

The preference of a sensor electrode for certain ions is commonly referred to as the selectivity of the sensor electrode for certain ions over other ions. This selectivity is governed by the tendency of the sensitive portion of the sensor electrode to sense given test ions over other ions at the same concentration. Thus, if the sensitive portion of the sensor electrode is of such composition as to more readily sense the test ion activity, the EMF noted on the electrometer will be mainly attributable to the test ion activity. This, in turn, provides an indication of test ion concentration.

Ideally, ionic concentration is related to ionic activity and EMF through the following relationship:

$$\text{EMF} = E^\circ + \frac{RT}{nF} \ln A = E^\circ + \frac{0.059}{n} \log A \quad (25^\circ \text{C.})$$

where EMF is the electrode potential, $E^\circ$ is a constant, $n$ is the ion charge ($\pm$) and A is the activity of the specific ion in solution. From the above equation, it can be seen that, ideally, a change in activity (A) equivalent to one order of magnitude causes a 59 mv. potential change when the ion is univalent and about a 30 mv. or 20 mv. change, respectively, when the ion is bivalent or trivalent. Thus, since a change in EMF represents a change in test ion activity, and since test ion activity can be related to test ion concentration, a noted change in EMF can be used to indicate test ion concentrations.

When a second ionic species to which the electrode will also respond is present, the observed potential can be described by the relationship:

$$\text{EMF} = E^\circ + \frac{0.059}{n} \log (A + KB)$$

where B is the activity of the secondary ion and K is the selectivity ratio. It is desirable to construct electrodes so that K is small so as to reduce the interference of B when measuring the activity of A.

As noted above, the ion sensitive portion of the sensor electrode determines which ion concentrations can be measured. Typically, the ion sensitive portions are in electrical contact with an internal reference electrode which, in turn, is in electrical contact with an electrometer. The second electrode used, the standard reference electrode such as a standard calomel electrode (S.C.E.), is also connected with the electrometer. When the sensor electrode and reference electrode are immersed in the test solution, a change in EMF will generally be attributable to changes in the activity of a particular ion which is sensed by the sensitive portion.

Sensor electrodes are available to measure a wide variety of inorganic ions such as $H^+$, $Na^+$, $K^+$, $Ag^+$, $Cu^+$, $Ca^{+2}$, $F^-$, $Cl^-$, $Br^-$, $I^-$, and $NO_3^-$.

PRIOR ART

Some of the earlier ion sensing electrodes utilized an electrode having a sensor portion consisting of a glass material. Such glass electrodes are well known and have been used to measure the concentration of such ions as hydrogen, sodium, and potassium. Examples of such electrodes can be found in U.S. Pat. No. 2,829,090 issued to G. Eisenman et al.

A more recent type of electrode utilizes a sensor portion consisting of a liquid membrane at which ionic exchange occurs through an interface between an organic ion exchange material and a test solution. By choosing an appropriate organic sensing phase for the organic ion exchange material, electrodes can be constructed to measure a wide variety of ions such as calcium, potassium, and the like. Examples of such electrodes may be found in U.S. Pat. No. 3,429,785 issued to J. W. Ross and U.S. Pat. No. 3,598,713 issued to G. Baum and W. Wise. Since ion sensing in the above electrodes takes place through an aqueous-organic phase interface, various methods have been devised to minimize leakage between the aqueous test solution and the organic sensing phase. In United States Patent No. 3,438,886, issued to Ross, and United States Patent No. 3,448,032, issued to Settzo et al., there are disclosed various porous hydrophobic-organophilic membrane materials which can be used to separate the organic and aqueous phases while still permitting an ion sensing interface. By minimizing the organic-to-aqueous phase leakage, the above disclosed membranes tend to prolong sensor electrode life.

In the above-described potassium ion sensitive electrode (U.S. Pat. No. 3,598,713), it was demonstrated that the potassium electrode disclosed therein may be used for measuring the concentration of potassium in serum. However, there are certain difficulties that have been observed utilizing the above electrode for serum potassium measurements. For example, to prevent "poisoning" of the electrode by endogenous proteins in serum, it is usually necessary to provide a cellophane barrier between the porous membrane support for the organic phase and the test solution. This cellophane barrier must be replaced at regular intervals. Often, the cellophane traps an air or water pocket, leading to erratic electrode behavior. Further, it has been found that the porous support membrane, commonly made of glass frit, is easily plugged or partially plugged, thus leading in time to an electrically noisy and unstable electrode.

It should be pointed out, however, that such problems also have been associated with other liquid-organic ion exchange electrodes that have been used to measure ion concentration in serum. For example, even though the cellophane and the porous discs used for known liquid-ion exchange electrodes can be replaced periodically, the new membranes must be first carefully saturated with the exchanger solution and then equilibrated with an electrolyte solution. Because of these common problems associated with electrodes having a liquid-organic phase, further attempts have been made to improve the operating characteristics of the electrodes by modifying the membrane or interface at which sensing occurs.

One of the more recent publications describing such attempts is an article by G. D. Moody et al., "A Calcium-Sensitive Electrode Based on a Liquid Ion Exchanger in a Poly(vinylchloride) Matrix," *Analyst 95*, 910 1970). In the above article, methods are disclosed for preparing an electrode having an ion sensitive membrane of polyvinylchloride which contains an ion sensitive organic phase for sensing $Ca^{++}$ activity. The sensing salt is dissolved in a solvent which also acts as a plasticizer for a PVC polymer which is used to form a PVC membrane. Various operational advantages are disclosed for the PVC membrane and one of the more significant advantages disclosed was the operational life-time of the electrode. Another cited advantage for the disclosed polymer membrane is that the need for an inert support material is avoided and, consequently, any ill-defined interface problems associated with such supports are minimized.

Another potassium selective membrane has been prepared by the addition of certain macrocyclic antibiotics to octanol-plasticized PVC membranes. See, for example, an article by H. K. Wipt et al., *Biochem.* and *Biophys. Res. Comm., 34*, 707 (1969).

We have now found that a similar type membrane, and in some cases, a more effective and easy to fabricate membrane, can be made which will measure the concentration of potassium in serum even in the presence of sodium ions.

Summary of the Invention

We have prepared an improved electrode sensitive to potassium wherein the improvement comprises a polymer membrane of plasticized polyvinylchloride containing a potassium tetraphenyl borate salt dissolved in a suitable solvent-plasticizer. The electrode comprises an electrically insulating electrode body having an opening in a portion thereof and a porous membrane disposed in covering relationship across the opening. The membrane comprises a polyvinylchloride matrix containing a potassium tetraphenyl borate which is dissolved in a solvent which is a suitable plasticizer for the polyvinyl chloride resin from which the membrane matrix is formed. The membrane has two essentially distinct faces, an outer face and an inner face. The outer face is contacted with the aqeuous test solution with the contacting portions forming the interface where ion exchange occurs. The inner face of the membrane is in electrical contact with an internal reference electrode which is otherwise electrically insulated from the aqueous test solution. The internal reference electrode may be of any conventional type such as that comprising a silver chloride bead on a silver wire with which an electrolyte salt bridge may be used. An alternative construction involves coating a conducting metal wire such as copper or silver with the membrane. The metal wire then becomes the internal electrode.

Brief Description of the Figures

FIG. 1 represents a partial cross sectional view of a representative electrode formed according to the principles of the present invention.

FIGS. 2 and 3 represent cross sectional views of representative modifications of the lower portion of FIG. 1.

Specific Embodiments

The main body of housing of our electrode may be similar to most of the electrode bodies found useful for containing the ion sensitive organic phase of liquid-organic ion exchange electrodes. Such bodies are well known and they have a variety of configurations. Generally, they consist of an elongated tube of an insulating material such as glass or plastic having openings in each end. One opening serves to admit and hold in place a lead from an internal reference electrode commonly contained within the tube. The other opening serves as a passageway for ion exchange between an aqueous test solution and an ion sensing phase also contained within the tube. In the case of known electrode bodies housing an ion sensing organic phase, a porous membrane, preferably hydrophobic-organophilic, is used to cover the sensing opening of the electrode body, thereby mechanically supporting the organic phase and minimizing or preventing leakage between the aqueous test phase and the organic sensor phase.

In our electrode, the organic sensing phase for potassium is contained within the polyvinylchloride membrane which also serves to keep the aqueous test phase separate from the salt bridge solution of the internal reference electrode.

To prepare a satisfactory membrane for our electrode, we have found that only certain groups of compounds can be used as plasticizers for a PVC plastisol resin since such compounds must also serve as effective solvents for the potassium tetraphenylborate needed to sense the activity of the potassium in solution. Thus, such compounds, which can be designated as solvent-plasticizers must serve two functions. Firstly, they must be effective solvents for the potassium borate salt such that the ion sensing salt demonstrates potassium ion selectivity in the presence of other ions. Secondly, they must also be effectively in plasticizing a PVC plastisol resin to form a structurally sound, easy to make PVC membrane containing the sensing salt in the solvent-plasticizer solution.

It has been found that there are three groups of compounds which accomplish the above two goals, and hence make good solvent-plasticizers. The first group includes aromatic diesters of the following formula:

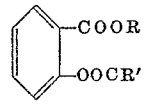

wherein R and R' represent alkyl groups having 4 to 18 carbon atoms. When alkyl groups below $C_4$ are utilized, the compounds are not good plasticizers for the PVC plastisol and tend to result in undesirably brittle membranes. When the alkyl groups are above $C_{18}$, the compounds have high melting points, tend to be waxy or solid, and thus have viscosities which tend to make it difficult to form the membranes. The viscosity of all our solvent-plasticizers is important for two reasons. Firstly, the viscosity must be low enough (i.e. not too high) to permit formation of the PVC membrane. Secondly, the viscosity must be high enough (i.e. not too low) to minimize sensor phase-aqueous leakage. For these reasons, the alkyl groups for our preferred solvent-plasticizer compounds have between 4 and 12 carbon atoms, the total of both alkyl groups preferably not exceeding 24 carbon atoms. Our especially preferred aromatic diester is dibutylphthalate. Aromatic monoesters are to be avoided as it is thought they are too volatile to serve as effective solvent-plasticizers.

A second group of compounds which were found to be good solvent-plasticizers include trialkylphosphates which, as in the case of the aromatic diesters, have alkyl groups ranging from $C_4$ to about $C_{18}$ for the same reasons. Preferably, the trialkyl phosphate alkyl groups are between $C_8$ and $C_{12}$ to provide a high enough viscosity to minimize leakage and low enough viscosity to permit easy PVC membrane formation. Examples of such trialkyl phosphates which serve as good solvent-plasticizers are trioctylphosphate and trinonylphosphate.

The third group of compounds which serve as good-solvent-plasticizers are nitro aromatic compounds of the following formula:

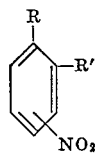

wherein R is selected from the group consisting of hydrogen, an alkyl group of 1-14 carbon atoms, lower alkoxy, and alkylcarboxy and R' is a member selected from the group consisting of hydrogen and alkyl groups having less than 4 carbon atoms. As in the case of other solvent-plasticizers, the nitro-aromatic compound limitations are based primarily on viscosity considerations which determine the lower and upper limits for the molecular weights and chain lengths of substitution groups. Again, too low a viscosity will tend to promote undesirable leakage between the aqueous phase of the test solution and the sensor phase. Too high a viscosity hinders formation of a good membrane matrix from the PVC plastisol. Typical nitro-aromatic compounds which act as a good solvent-plasticizers are p-hexylnitrobenzene and p-nitrophenyl octyl ether. Interestingly, one of the solvents of choice for the liquid organic K+ electrode of U.S. Pat. No. 3,598,713, 3-o-nitroxylene, was not a suitable plasticizer for the PVC and did not yield good working membranes.

Suitable resins which may be used for membrane formation include many vinyl resins which are commercially available. Examples of such resins are the high molecular weight predominantly vinyl chloride polymers such as Bakelite Vinyl Dispersion Resin QYOH-2®, Geon 121®, and Exon 654®. A preferred plastisol consists of polymer units having an average molecular weight of about 50-100,000.

The ion exchange materials for our electrode membrane are identical to those disclosed in the U.S. Pat. No. 3,598,713. Such materials are represented by the following formula:

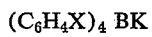

$$(C_6H_4X)_4 \text{ BK}$$

wherein X is a member selected from the group consisting of chlorine and phenoxy. Such potassium ion sensing salts are more fully described in the above patent which is incorporated herein by reference.

Generalized steps for preparing an electrode employing the present principles can be set forth as follows:

(1) A substituted potassium tetraphenylborate salt is dissolved in one of the solvent-plasticizers such that the resulting solution comprises about .5 to 5% by weight salt with a preferred range being about 1-3% by weight salt to assure a sufficient amount of salt for ion sensing.

(2) Next, the PVC plastisol resin is dispersed in the solution of (1). The amount of resin in the dispersion may range from about 30 to 60% by weight to form a useful PVC membrane, but a preferred amount of resin is about 50% by weight.

(3) After dispersion of the plastisol resin in the solution of (1), the membrane material is cast by conventional techniques so that the resulting sheet of PVC containing the solvent-plastisizer and salt will have a thickness of between about 6 to 50 mils, preferably between 10 and 25 mils. It was found that the electrochemical behavior of the membrane electrodes is related to membrane thickness. Thin films, less than 6 mils, did not act as permselective membranes. For example, the observed potential across the membrane was not altered by dilution of the sample. On the other hand, films exceeding 50 mils exhibited extreme electrostatic sensitivity and their electrochemical characteristics were difficult to examine. These effects are believed to be related to the resistance of the membrane. The membrane formation and control of its thickness may be accomplished by such conventional techniques as with a doctor blade or mold, or by rolling, pressure molding, or extruding the membrane material.

(4) Once the membrane material has been cast, it is fused or cured for a short time at a temperature between about 140 and 240° C. with a preferred temperature between 180°-200° C. for about two minutes.

(5) Once fused, the membrane material can be cut to shape in the form of a disc which will serve as the ion sensitive membrane of the electrode housing. The cut disc may be held in place over the sensing opening of the electrode housing by any conventional means such as by an o-ring, or by gluing to the outer rim of the opening with a cement which will not interfere with the ion sensing function of the membrane. Examples of water insoluble adhesives which may be used to adhere the membrane to the electrode housing include epoxy, urethane, cyanoacrylate adhesives, and the like. By forming the membrane material in sheets larger than that actually needed for the disc, a number of advantages are seen. For example, since the sheets can be stored, added membranes may be cut as needed for replacement. Further, by attaching the disc to the electrode housing in a removable manner (for example by using an o-ring or the like), the membrane can be easily disposed of before moving from test solutions of greatly different chemical composition, thus avoiding potential hysteresis problems. Since the formation of the membrane sheet is a relatively easy and inexpensive process, it may be more economical to use a new disc for each measurement even though one of the primary advantages of the present membranes is their relatively long sensor life compared to known liquid organic sensing phases.

The actual construction of our electrodes can be better understood by referring to FIGS. 1-3. In FIG. 1, an electrode 3 consists of a plastic housing 5 in which is contained an internal reference electrode 7 held in place by a housing cap 9 which is of an insulating material such as rubber. The housing cap 9 can hold the internal reference electrode 7 in place by friction or other means. A lead 11, in electrical contact with the internal reference electrode 7 and insulated by an insulating material 13 extends from the electrode cap 9 and is connectable to an electrometer. Contained within the electrode housing 5 is a conventional salt bridge solution 15 in electrical contact with the internal reference electrode 7 and the membrane 17. The membrane 17 is held in place by an internally threaded plastic cap 19 which engages mating threads on the lower portion of the housing 5. The membrane 17 is further secured with the aid of an o-ring 21 which helps retain the membrane during assembly. A similar o-ring 23 may be used to assure a tight fit of the cap 19 against the housing 5.

The outer face of the membrane 17 provides an interface for ion sensing through a circular opening 25 in the membrane retaining cap 19. The inner face of the membrane 17 is in electrical contact with the salt bridge solution 15.

FIGS. 2 and 3 illustrate two other ways the membrane 17 may be attached to the sensing ends of different electrode housings 31 which do not require threaded portions to engage a threaded cap such as that shown in FIG. 1. The electrode housings 31 of FIGS. 2 and 3 are made of glass. In FIG. 2, the membrane 17 is shown held in place by an o-ring 27. In FIG. 3 the membrane is shown held in place by a suitable cement 29. Other methods for attaching the membrane 17 to the sensing end of an electrode housing are, of course, possible. The main requirement is that the membrane act as a barrier supporting the salt bridge solution, when used, thereby keeping it from leaking into the test solution or vice versa.

Our initial membranes were prepared by using as solvent-plasticizers the organic phase potassium ion sensing systems described in U.S. Pat. No. 3,598,713.

Although operable electrodes resulted, these electrodes displayed excessive electrical noise, thus not resulting in optimally functioning electrodes. We found, however, that is was possible to use other solvents than those described in the above patent. Solvents which were known to be particularly good plasticizers for PVC were initially investigated. Esters of phthalic acid such as dibutylphthalate, dioctylphthalate, and di-i-nonylphthalate gave films or membranes with excellent properties and favorable electrode characteristics. We were also able to prepare excellent films from organophosphate plasticizers such as trioctylphosphate.

We also found that nitroaromatic compounds containing a long chain alkyl substituent such as p-hexylnitrobenzene could also be used to solubilize the exchange salt and plasticize the PVC film. Likewise, p-nitrophenyl octyl ether was found to be both a good solvent for the sensing salt and a good plasticizer for the PVC, and by using membranes prepared with that solvent-plasticizer, one of our preferred electrodes resulted. These plasticized films showed some variance with respect to their selectivity to sodium and potassium. Selectivity is especially important since the major applications of such electrodes are in environments where sodium cation concentration is significantly higher than potassium ion concentration as, for example, in sea water and various body fluids such as serum, urine, and sweat.

In preparing potassium ion sensitive membranes with the various solvent-plasticizers described above, significant advantages were realized in being able to prepare full sheets of the membrane material, from which discs were later incorporated in the electrodes could be prepared. The prepared polymer sheets could be stored for extended periods of time for later use.

Although the membrane preparation is subject to various modifications, our membranes are preferably prepared as plastisols by incorporating the exchange salt solution in a vinyl dispersion resin. Vinyl dispersions are suspensions of a resin in liquids which do not dissolve the resin at ordinary temperatures. In a plastisol, the vinyl resin particles are dispersed into a plasticizer, the mixture is cast, drawn, or sprayed into a thin film, and then the mixture is heated to fuse or cure the particles, forming a continuous film. In our membranes, the salt dissolved in the solvent-plasticizer becomes an intergral part of the film.

Other less desirable methods for utilizing resins require a solution of the resins at low concentrations or the manipulation of the resin in a molten state. The first method places severe limitations on the types and molecular weight of the resin which can be utilized, and the second method requires undesirably high temperatures and the use of expensive equipment. The vinyl dispersion technique avoids these limitations and permits the use of high molecular weight vinyl chloride homopolymers which cannot be used in the solution process. These higher molecular weight homopolymers produce strong, flexible films when used as plasitols.

Not all of our solvent-plasticizers are commonly used as plasticizers for PVC. In one of our especially preferred electrodes, the solvent-plasticizer was p-nitrophenyl octyl ether. Electrodes having membranes prepared with this solvent-plasticizer possessed optimal selectivity and stability characteristics. The preference of the electrode for potassium over sodium was found to be sufficient to enable accurate measurements of the serum potassium levels, e.g., the selectivity ratio $R_{KNa}$ was found to be 0.02.

In the examples which follow, membranes which had been plasticized with a number of different solvent-plasticizers were used to measure potassium ion concentration both alone, and in the presence of sodium ions. The compounds used in preparing the membranes described below represent some of our preferred solvent-plasticizers. Accordingly, it is intended that the following examples should be illustrative only as to the preparation and use of some particularly preferred electrodes.

EXAMPLE I

Preparation of Membrane

A membrane utilizing a representative aromatic diester, dibutylphthalate, was prepared by the following procedure.

A 5% by weight solution of potassium tetra(p-chlorophenyl) borate in dibutylphthalate was prepared. This solution was used as a solvent-plasticizer. A paste of 50% by weight of solvent-plasticizer to PVC resin was made and mixed well. The paste was spread in a mold and heated to 200° C. for about 2 minutes. The film was removed after cooling to room temperature. A small disc was cut from the film and placed in the bottom cap (19 of FIG. 1) of the electrode barrel. A saturated KCl solution, which served as the internal electrolyte, was placed within the barrel housing, followed by the internal reference electrode assembly. This completed electrode was used with the saturated calomel reference electrode (S.C.E.) to measure potassium ion concentrations. Typical electrode responses against single electrolyte solutions are given in Table I.

TABLE I

| Cation at $10^{-1}$ M | EMF (mv. vs. S.C.E.) |
|---|---|
| $Na^+$ | −184 |
| $K^+$ | −131 |

From the data in Table I the following selectivity ratio can be calculated:

$$K_{K, Na} = 0.12$$

This electrode has a preferential order of $K^+ > Na^+$ at 0.10 M electrolyte.

EXAMPLE II

Another membrane was prepared using a representative trialkylphosphate. The membrane was prepared as in Example I but by using tri(2-ethylhexyl)phosphate as the solvent-plasticizer. The electrochemical behavior of the cell with this membrane is given below in Table II.

TABLE II

| Cation at $10^{-1}$ M | EMF (mv. vs. S.C.E.) |
|---|---|
| $Na^+$ | −159 |
| $K^+$ | −207 |
| $NH_4^+$ | −132 |

From the data in Table II the following selectivity ratios can be calculated:

$$K_{K, Na} = 48$$

$$K_{K, NH_4} = 75$$

This electrode has a preferential order of $$NH_4^+ > Na^+ > K^+$$

at 0.10 M electrolyte.

EXAMPLE III

Another membrane was prepared with one of the representaive alkylnitrobenzenes. The membrane was prepared as in Examples I and II but by using p-hexylnitrobenzene as the solvent-plasticizer. The electrochemical behavior of the electrode made with this membrane is given in Table III below.

TABLE III

| Cation at $10^{-1}$ M | EMF (mv. vs. S.C.F.) |
|---|---|
| $Na^+$ | −251 |
| $K^+$ | −155 |
| $NH_4^+$ | −154 |

From the data in Table III, the following selectivity ratios can be calculated:

$$K_{K, Na} = 0.022$$

$$K_{K, NH_4} = 1.0$$

The preference order for this electrode is $$K^+ = NH_4^+ > Na^+$$

at 0.10 M electrolyte.

EXAMPLE IV

The plasticized polymer membrane, using the solvent-plasticizer described in Example III above, was used to detect the presence of potassium cations in a large excess of sodium cations. The results of these measurements are given in Table IV below.

TABLE IV

| Solution composition | EMF (mv. vs. S.C.E.) | ΔE |
|---|---|---|
| 0.10 M NaCl | −253 | |
| 0.10 M NaCl+0.001 M KCl | −240 | +13 |
| 0.10 M NaCl+0.002 M KCl | −233 | +20 |
| 0.10 M NaCl+0.003 M KCl | −227 | +26 |

The symbol ΔE is the difference in potential between a solution containing NaCl only and a solution containing a mixture of NaCl and KCl.

By using the potassium sensing membrane of our electrodes, numerous advantages have been found over the use of the liquid ion exchange electrode of the type described in U.S. Pat. No. 3,598,713. One of the more significant advantages is that a protective cellophane film is not required for our polymer membrane with potassium in serum. This provides not only a simplification in construction, but also a major improvement in reliability since many operational difficulties were attributed to the cellophane film, as noted above. It should be pointed out that, although our polymer membrane electrode represents a significant improvement over the electrodes described in the above patent, many of the teachings of that patent are applicable to the present electrode. One of the more important components for our potassium sensitive membrane is the solvent-plasticizer used to plasticize the PVC and solvate the potassium ion sensing salt. The detailed examples given were based on using some of our preferred solvent-plasticizers. One of our preferred solvent-plasticizers is the $p$-nitrophenyl octyl ether in the proportions used in the examples.

As noted above, the main requirements for our solvent-plasticizers are that they accomplish a twofold purpose. Thus, it can be appreciated that the membranes of our electrodes are subject to numerous variations, all within the scope of the present invention. Therefore, it is intended that the examples given above should be construed as merely illustrative and not limiting.

We claim:

1. An improved electrode for measuring the concentration of potassium in an aqueous solution comprising:
    (a) an electrically insulating body having an opening at a portion thereof;
    (b) a fused membrane disposed in covering relationship across the opening, the membrane comprising:
        (i) a polyvinylchloride matrix containing
        (ii) an ion exchange material having the formula $(C_6H_4X)_4$ BK wherein X is chlorine or phenoxy and
        (iii) a suitable solvent-plasticizer;
    (c) an internal reference electrode contained within the body of (a) and in electrical contact with the membrane of (b).

2. The electrode of claim 1, wherein the solvent-plasticizer comprises aromatic diesters of the formula

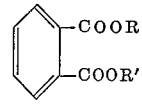

wherein R and R' are alkyl groups each having 4 to 18 carbon atoms.

3. The electrode of claim 2 wherein the aromatic diester is dibutylphthalate.

4. The electrode of claim 1, wherein the solvent-plasticizer is a trialkylphosphate, the alkyl groups each having 4 to 18 carbon atoms.

5. The electrode of claim 4, wherein the trialkylphosphate is tri(2-ethylhexyl)phosphate.

6. The electrode of claim 1, wherein the solvent-plasticizer is a nitroaromatic compound of the formula

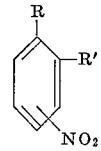

wherein R is a member selected from the group consisting of hydrogen, an alkyl group having 1–14 carbon atoms, lower alkoxy, and alkylcarboxy, and R' is a member selected from the group consisting of hydrogen and an alkyl having less than 4 carbon atoms.

7. The electrode of claim 6, wherein the nitroaromatic compound is selected from the group consisting of $p$-hexylnitrobenzene and $p$-nitrophenyl octyl ether.

8. The electrode of claim 1, wherein the membrane has a thickness between about 10 to about 25 mils.

9. The electrode of claim 1 wherein the weight of ion exchange material to solvent-pasticizer is about 0.5 to 5.0%.

10. The electrode of claim 1, wherein the insulating body of (a) is a plastic material, and the membrane of (b) has a thickness between about 10 to about 25 mils and comprises a polyvinyl chloride matrix containing potassium tetra($p$-chlorophenyl)borate as the ion exchanger and dibutylphthalate as the solvent-plasticizer.

References Cited

UNITED STATES PATENTS

| 3,598,713 | 8/1971 | Baum et al. | 204—195 L |
| 3,429,785 | 2/1969 | Ross | 204—1 T |
| 3,562,129 | 2/1971 | Simon | 204—195 M |
| 3,691,047 | 9/1972 | Ross et al. | 204—195 M |
| 3,450,631 | 6/1969 | Bloch et al. | 210—22 |

OTHER REFERENCES

G. J. Moody et al., Analyst, vol. 95, pp. 910–918, (1970).

GERALD L. KAPLAN, Primary Examiner

UNITED STATES PATENT OFFICE
CERTIFICATE OF CORRECTION

Patent No. 3,835,011                    Dated September 10, 1974

Inventor(s) George Baum and Merrill Lynn

It is certified that error appears in the above-identified patent and that said Letters Patent are hereby corrected as shown below:

Column 1, line 67, after "30 mv." insert -- or --.

Column 3, line 34, "macrocyclic" should be -- macrocylic --.

Column 4, line 35, "effectively" should be -- effective --.

Column 4, line 45, in the figure "OOCR'" should be -- COOR' --.

Column 5, line 3, "good-" should be -- good --.

Column 8, line 55, "$K_{K, NH4} = 75$" should be -- $K_{K, NH_4} = 75$ --.

Column 9, line 5, "$K_{K, NH4} = 1.0$" should be -- $K_{K, NH_4} = 1.0$ --.

Signed and sealed this 26th day of November 1974.

(SEAL)
Attest:

McCOY M. GIBSON JR.                C. MARSHALL DANN
Attesting Officer                  Commissioner of Patents